Nov. 20, 1928.  
W. H. SMITH  
1,692,587  
APPARATUS FOR REDUCING METALLIC OXIDES  
Filed Feb. 17, 1926  4 Sheets-Sheet 1

INVENTOR.  
William H. Smith  
BY  
Stuart C. Barnes  
ATTORNEY.

Nov. 20, 1928.  
W. H. SMITH  
1,692,587  
APPARATUS FOR REDUCING METALLIC OXIDES  
Filed Feb. 17, 1926  
4 Sheets-Sheet 2

INVENTOR.  
William H. Smith  
BY  
Stuart C. Barnes  
ATTORNEY.

Nov. 20, 1928.
W. H. SMITH
1,692,587
APPARATUS FOR REDUCING METALLIC OXIDES
Filed Feb. 17, 1926    4 Sheets-Sheet 3

INVENTOR.
William H. Smith
BY Stuart C. Barnes
ATTORNEY.

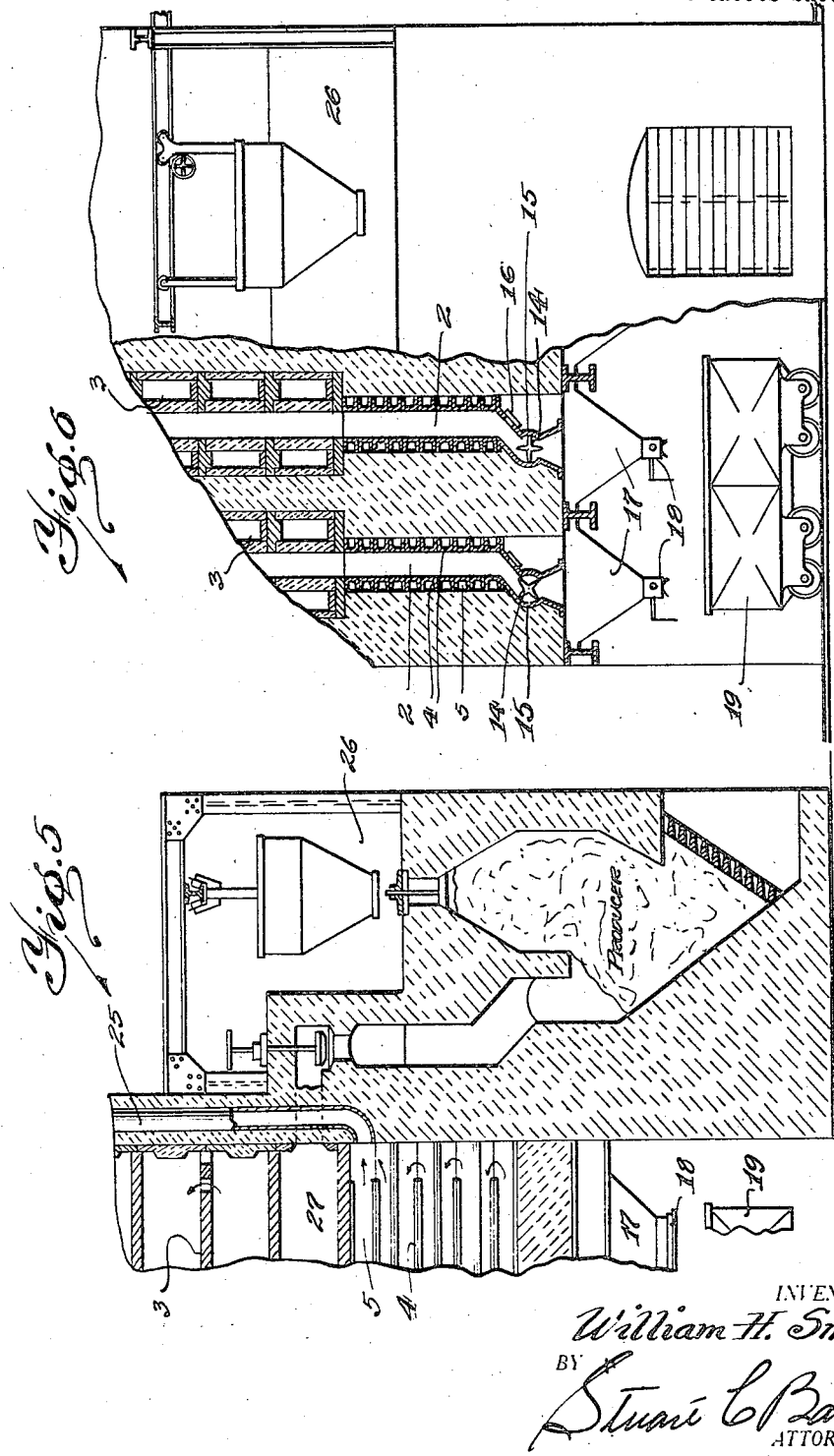

Patented Nov. 20, 1928.

1,692,587

UNITED STATES PATENT OFFICE.

WILLIAM H. SMITH, OF DETROIT, MICHIGAN, ASSIGNOR TO GENERAL REDUCTION CORPORATION, OF DETROIT, MICHIGAN, A CORPORATION OF DELAWARE.

APPARATUS FOR REDUCING METALLIC OXIDES.

Application filed February 17, 1926. Serial No. 88,774.

My invention relates to a method and apparatus for reducing metallic oxides. It is particularly adaptable for the reduction of iron ore and has to do with a method of reduction wherein the oxygen is removed from the ore by the application of heat in the presence of a reducing agent to leave the iron free in its metallic condition known as sponge iron.

The process of reducing iron ore with solid or gaseous material, and the heating of this mixture at relatively low reducing temperatures to produce sponge iron has been known for many years. Sponge iron of this nature has been manufactured by what is known as the hand method; that is, the mixture, comprising a layer of charcoal, a layer of ore, et cetera, is usually placed in a retort, or tube, and a fire built on the outside of the tube whereby the tube is heated from the outside to a temperature sufficient to cause the oxygen to leave the iron and unite with the carbon, or reducing agent. Many devices have been designed in an attempt to reduce iron ore by this method on a commercial, economical scale, but such devices have been unable to produce true sponge iron on a commercial scale and at production cost that will permit its use in the manufacture of commercial iron and steel. The best known types of apparatus and processes for reducing ore, corresponding to the so-called hand process, comprise the rotary kiln type of furnace, the circular retort types, and other elaborate furnace structures, including the muffled kiln type. Some of these structures have improved the efficiency of heating the ore, but all such methods have been either impractical or inefficient, or both, for the reason that they have all required an excessive amount of fuel, and with most of them it has been impossible to reduce the ore uniformly throughout, with the result that the reduced iron has been inferior in quality. Some of these furnaces of the prior art have also been objectionable in that some of them agitated the iron ore which has resulted in uneven heating and waste of fuel; and others have exposed the ore directly to a heating flame whereby the finer particles have been blown out of the furnace.

My invention has to do primarily with the provision of separate zones of heat and the reduction of the ore by passing the material and reducing medium through such zones of heat in such a manner that, part of the mixture will be heated to just sufficient temperature in one zone to cause a reaction between the ore and reducing medium; the heat in the reduced iron will be absorbed in another zone; and the heat absorbed transferred to another zone to assist in pre-heating the incoming mixture, or to assist in heating the ore at the reaction zone. This method of applying and controlling the heat in reducing the ore is accomplished by the provision of a novel and compact furnace of a type wherein the ore is passed continuously through the furnace and subjected to heat by conduction in such a manner that the ore is completely reduced to commercial form and delivered at a temperature for handling, and with the use of such a small amount of fuel as to render the production cost of the reduced iron much lower than the cost of sponge iron heretofore obtained. Another feature of my invention has to do with the provision of a plurality of relatively narrow, vertical retorts for receiving and passing the ore continuously and preferably by gravity through the furnace, whereby the ore is subjected to the maximum amount of heated surfaces to effect thorough and even heating of the gravity fed ore.

Figures 3, 4:
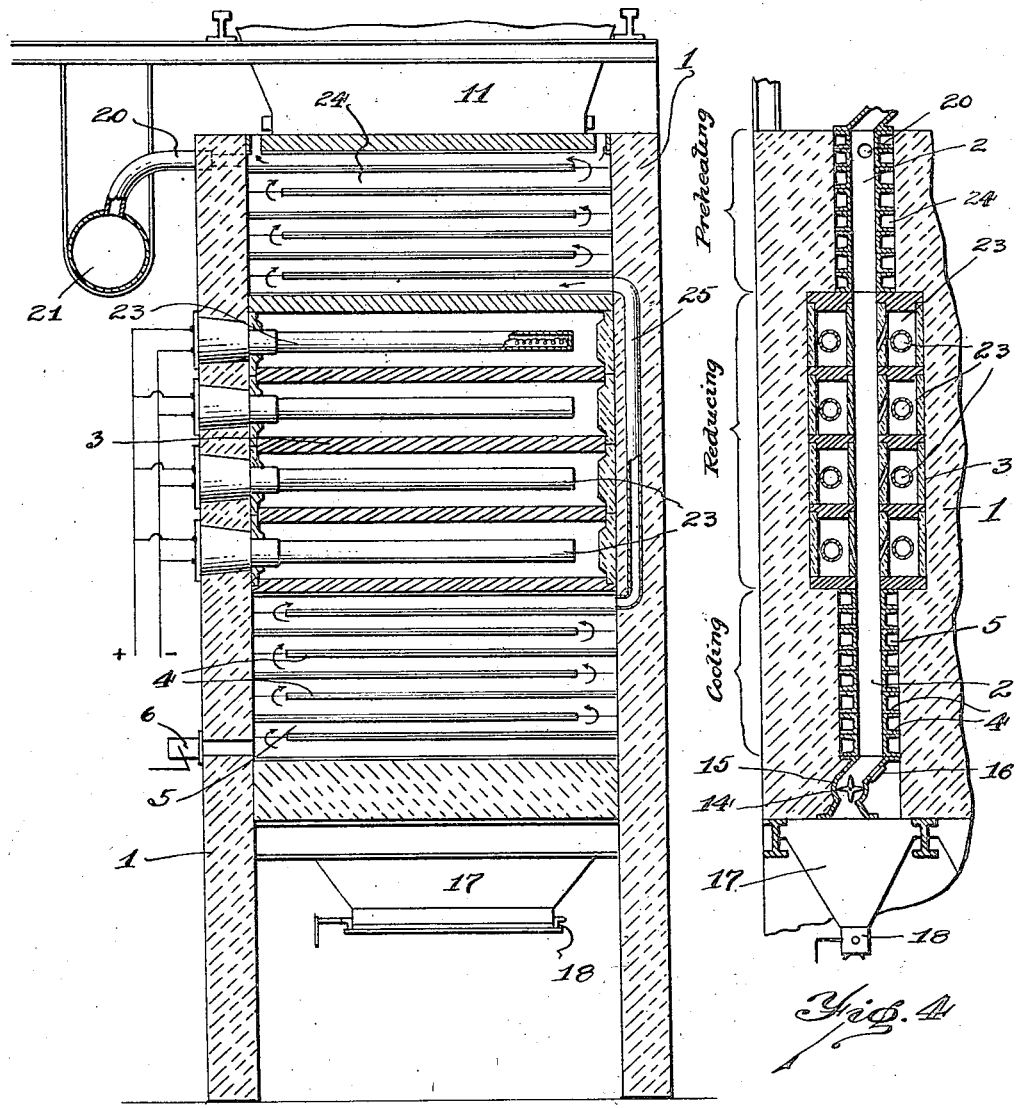
Fig. 3 is a vertical cross section, similar to Fig. 2, through a modified form of furnace construction wherein the heat for effecting the reduction is furnished by electrical resistance elements and also showing the preferred manner of arranging air ducts above and below the heat units.

Fig. 4 is a fragmentary vertical cross section of the structure shown in Fig. 3 and illustrating in particular the manner of controlling the temperatures of the retorts or ore passageways, wherein the ore entering the retort is pre-heated, the ore in the center of the retorts is heated to a temperature sufficient to cause reaction with the carbon, a reducing agent, in the mixture, and the ore at the bottom of the retort is cooled before delivery.

Figure 2:
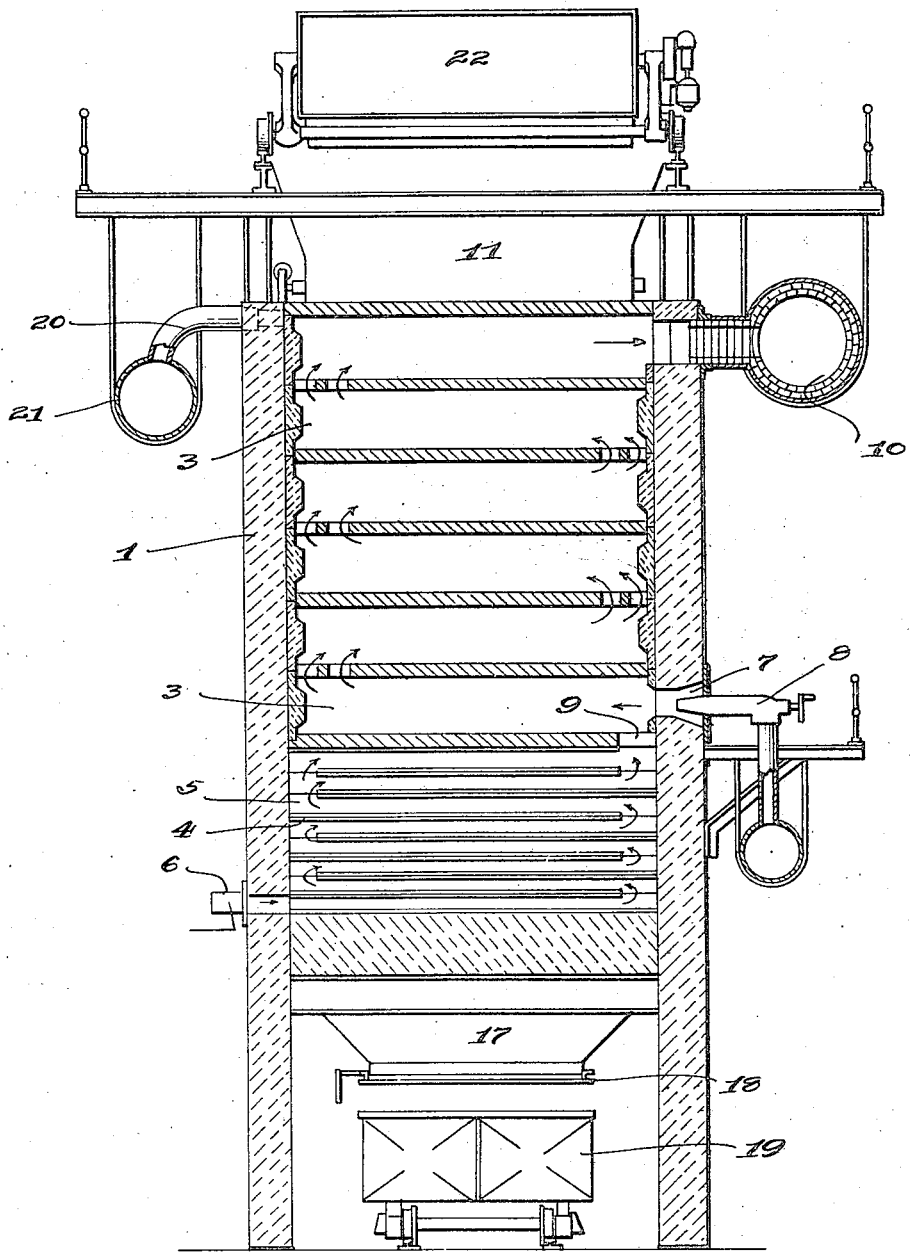
Fig. 2 is a vertical cross section taken through one of the retorts shown in Fig. 1 and illustrating the manner of heating the furnace when a fuel is used of a nature requiring excess air for combustion.

Fig. 5 is a fragmentary vertical cross section similar to Figs. 2 and 3 but showing a modified form of heating unit.

Fig. 6 is a fragmentary vertical cross section of the structure shown in Fig. 5.

In describing the various parts of my invention it would be well to recognize that the apparatus preferably used therein is divided broadly into a feeding mechanism, a reducing apparatus, and removing or delivering apparatus. However, these three combinations are relatively dependent in that the proper reduction of the ore and the controlling of the temperatures is dependent on a feeding and removing mechanism similar to, but not necessarily the same as that disclosed. In the various types of furnaces shown each retort is shown as comprising three main zones, which may be designated the pre-heating zone, the ore reducing zone, and the cooling zone.

Figure 1:
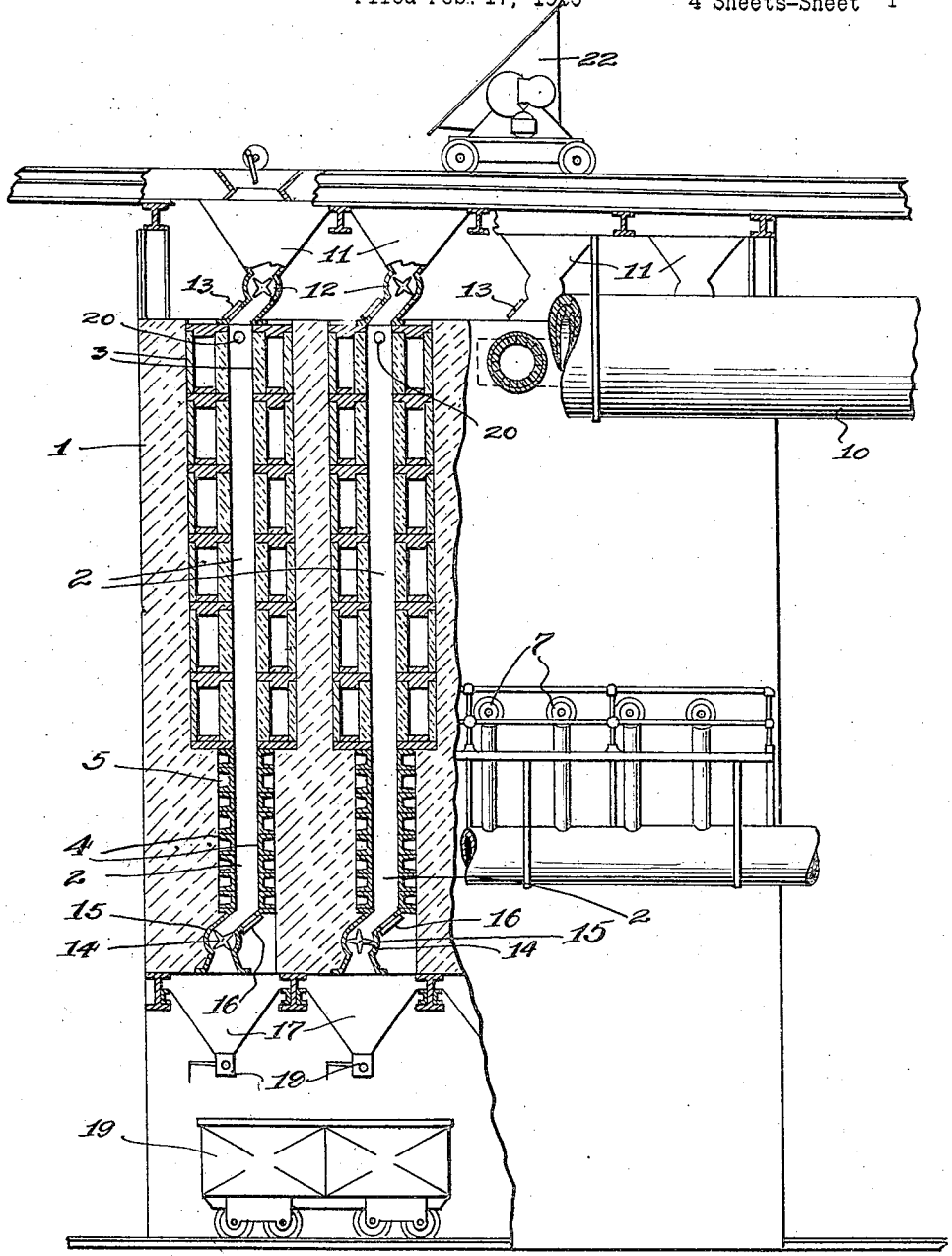
Fig. 1 is a fragmentary side elevation, partly in section of a furnace constructed in accordance with my invention and showing a furnace formed of a bank of four retorts, two of the retorts being shown in section.

The furnace as shown in Figs. 1 and 2 may be designated 1, and may comprise as many units as desired, according to the production desired, and without in any way affecting the efficiency. As illustrated in Figs. 1 and 2 the furnace 1 is made up of a bank of four retorts 2 formed by as many units. It will be obvious that the main part of the furnace may be constructed as a unit comprising a large number of retorts, or as many as desired. Each of the retorts 2 consists of a vertical and preferably narrow passageway, rectangular in cross section as best illustrated in Figs. 1 and 2, the walls of which are formed by the walls of the heat conducting or absorbing units.

The upper part of each retort is, as shown in Fig. 1, formed by the inner walls of a parallel series of flues 3 which are built of refractory material. These blocks may be hollow in cross section, and as shown in Fig. 2, are relatively long so as to present a maximum amount of heating surface. In the particular form, as shown in Figs. 1 and 2, the refractory flues 3 are provided with ports at outer ends thereof whereby the gases in passing from the bottom to the top flues, will pass longitudinally of the flues, and in a tortuous path as illustrated in Fig. 2. It will be understood that these refractory flues may be made up of any number of parts desired and also may be made removable for replacement, although in view of the relatively low temperatures utilized in my method such replacements should be very rare.

The lower portion of the vertical retorts 2 are formed by the walls of metallic sections 4, which when combined with the walls of the furnace form the air conducting flues 5. These sections 4 are so arranged that air entering through the port 6 will pass longitudinally and in alternate directions through each individual flue. The air from the top sections 4, or flues 5, is in the particular furnace shown in the Figs. 1 and 2, designed to empty into the lower heating flue 3, which flue is also designed to receive the incoming fuel for combustion.

A suitable port 7 is provided in the side of the furnace for each section of flues, as shown in Figs. 1 and 2, for the reception of a suitable burner 8. When this burner 8 is supplied with a relatively rich fuel requiring excess air for combustion, the air from the lower flues 5 is designed to be admitted to the refractory flues 3 at a point 9 where it will readily mix with the incoming fuel to form a combustible mixture. This combustible mixture will burn in one or more of the horizontal flues 3 and the products of combustion will heat the remaining flues as it passes towards the waste flue, or stack 10, thereby conducting its heat to the incoming ore and leaving stack 10 at a comparatively low temperature.

The top part of each retort 2 is provided with a feeding hopper 11. This hopper is flared at its upper end to receive its mixture of material comprising the charge and the lower part of each hopper terminates in, or is provided with, suitable valves 12. In the drawings these valves are shown as comprising rotary valves. The delivery part of each hopper, or the conduit between the valves 12, and the upper end of each retort 2 is preferably positioned at an angle relative to the vertical axis of each retort, and the top part of each inclined conduit is provided with a cover opening 13 whereby, the movement of the material may be assisted by suitable means inserted through the openings 13.

The bottom part of each passageway, or retort tube, is provided with rotary valves 14, similar to the valves 12. These valves are mounted in a suitable outlet hopper or conduit 15, each of which is provided with a suitable cover 16, whereby access may be gained to the retorts from below. The reduced ore, after being cooled in the lower zone, or retort, may be discharged continuously, or at intervals, by the valves 14 into suitable hoppers 17. Each hopper 17 is provided with a suitable gate 18 whereby the sponge iron or reduced material may be dumped into a traveling car 19. The gases produced by the action of the ore, and reducing agent pass from each retort 2, through the flue 20 and into the gas main 21.

In operation the material is conveyed to the particular retort by means of a suitable dump car 22. The material as used may include any ore, or other materials, and a reducing agent of charcoal, anthracite coal, coke, wood residue, or the like may be used. This mixture of ore and reducing agent is fed into the hoppers 11 and the mixture of ore is intermittently, or continuously fed into the retorts by means of the valves 12. It will be understood that the valves 12 and 14 may be mechanically and automatically operated and adjustably timed in accordance with the ore production. In the normal operation of the furnace, the combustible mixture of fuel and air in the lower flues 3 is such as to heat the central zone of the flues to the proper reaction temperature which may be around 1800° Fahrenheit. The mixture of ore and reducing agent being fed by gravity, or conveyor, through the retort passageway tube will first come in contact with the upper zone of the retort and be pre-heated by the products of combustion. As this pre-heated mixture reaches the central zone of the retort passageway the reduction reaction takes place whereby the reducing material combines with the oxygen in the ore. After reduction the reduced iron is moved to the lower or cooling zone, in which zone the air entering the valve 6 absorbs the heat from the reduced ore, or sponge iron whereby the iron, when it reaches the discharge valves 14 will be at a low temperature. In other words, the sponge iron when delivered from the retort will be in what is known as working condition and ready to be handled immediately upon delivery.

A modified form of apparatus for carrying out my method is disclosed in Figs. 3 and 4 wherein the heat conducting flues are replaced by electrical resistance units 23. These units may be of any form desired and are preferably removably inserted in the walls of the furnace and extend lengthwise of the retort channel. The retort channel 2 is preferably of the same dimensions as the retorts shown in Figs. 1 and 2 but the three zones, namely the pre-heating, reduction heating, and cooling zones are more defined. The reduction, or reaction zone has a limited number of units 23 containing the electrical resistance coils. The top part, or pre-heating zone of the retort is provided with a series of air flues 24 which are preferably similar in construction and arrangement to the air flues 5. The air pre-heated in the lowermost air flues 5 by the out-going reduced iron is conducted to the pre-heating air flues by a pass conduit 25, as clearly shown in Fig. 3. This air, after having transferred the heat units to the incoming ore and reducing material may be directed into the atmosphere. It will be obvious that no waste flue is required as there are no products of combustion. Otherwise this furnace utilizing electrical heating unit is constructed the same as the furnace disclosed in Figs. 1 and 2 and previously described.

A further modified form of apparatus for carrying out my method is disclosed in Figs. 5 and 6. The furnace used in such modified apparatus is preferably the same as that disclosed in Figs. 3 and 4; that is; the walls of the retort are made up of flues which form separate heating zones, the lower section or zone being made up of air flues, the center section, or zone, being made up of combustion or electrical heating flues and the top section, or zone, being made up of pre-heating flues. The modification in this third form of furnace which distinguishes it from the other two forms described, is that instead of utilizing a raw fuel or electric resistance means, I make use of a gas producer as a means for supplying the heat necessary for reduction. This gas producer may be of any standard design and may be designated, generally, 26. The air may be forced through the fuel bed in any desired manner, such as by suction or pressure, and the resulting combustible gas admitted to the combustion flues 27 which are similar in form to the flues 3, as shown in Fig. 2.

The operation of each of the furnaces as described is essentially the same and in the preferred form of reducing the iron ore I mix the iron ore, or other metallic oxide with a reducing agent and feed the mixture through the valves at the top of the retorts. However, it will be understood that in place of utilizing a solid carbonaceous reducing agent that I can utilize a reducing gas which may be preferably introduced in the bottom of the retorts. These reducing gases admitted in the bottom of the retort will pass through the reduced iron and absorb the sensible heat from such iron whereby the reducing gas will become pre-heated before entering the actual reducing zone where such gases are raised to a reaction temperature to combine with and liberate the oxygen from the ore.

Another important advantage of my novel reduction furnace is that such furnaces can be readily utilized as gas producers by taking a $CO_2$ gas from any source, and passing such gas through the retort in presence of excess carbon, and through the reduction zone and out to the gas main. In this reaction while there may or may not be some oxygen taken up by the reduced sponge iron, I have found that the practice of passing a $CO_2$ gas through a reduced iron in the presence of carbon at the proper temperature that very little oxidization takes place in the sponge iron, and not enough oxidization to affect that produced for metallurgical use, particularly where the resulting sponge iron is to be used in open hearth or electric furnaces.

After the sponge iron is discharged and removed from the reduction retorts the gangue may be separated from the iron by magnetic concentration, or any other suitable means.

It will be understood that the various flues making up the different zones of my retorts may be arranged either vertically or horizontally as desired, so long as they are constructed as to present a retort which is relatively long and narrow in cross section whereby the ore may be fed through the retort and come in contact with the maximum surface of walls whereby it can be progressively pre-heated, reduced and cooled with maximum economy in the use of fuel.

It will thus be seen that I have provided a novel furnace for reducing iron ore, or like metallic oxides, with a minimum amount of heat. The individual retorts are long and narrow in cross section and are arranged in groups of many units of unlimited length. This effects a most economical conservation of heat because the only heat lost by radiation is from the outer sides of the two end retort walls. It will be obvious that in large insulations requiring many units that the units can be arranged concentrically, in which case there will be no appreciable heat losses by radiation. Furthermore, the furnace is continuous in action and substantially all the heat created in the reducing zone is utilized advantageously in the furnace, the reduced iron being discharged in a comparatively cool condition and the products of combustion, if any, being discharged through the waste stack also in a comparatively cool condition.

It will be obvious that the feeding of the iron ore and reducing medium in a thin flat enclosed stream, in combination with the conservation of the ore reducing and preheating fuel is one of the important features of my invention and it will be understood that in referring to the apparatus for, or the method, of feeding the fuel in thin flat streams that I do not intend to be limited to a single homogeneous stream but that such stream may be in general a thin flat stream and at the same time be divided up into a plurality of small flat streams to make up the general flat stream of relatively long and narrow cross section.

What I claim is:

1. Ore reducing apparatus for reducing iron ore, comprising a series of heating units, each relatively long and narrow in cross section and spaced to form a bank of units, and a series of constantly enclosed ore conducting retorts positioned in between the series of units whereby to separate the units and to confine the heating medium between the retorts, means for passing ore to be reduced through the series of retorts, and means for maintaining three similar but distinct heat zones in each heating unit.

2. Ore reducing apparatus for iron ore, comprising a plurality of units for confining a heating medium, said units being arranged and positioned between retorts for conducting iron ore to be reduced, a plurality of flues positioned below said heating units for receiving and conducting a cooling medium, and a plurality of flues positioned above said heating units for receiving and circulating the medium from said lower flues after it has performed its cooling function.

3. Ore reducing apparatus for reducing iron ore, comprising a plurality of flues for receiving and conducting a heating medium therethrough, one or more retorts formed between walls of the flues for receiving and conducting iron ore to be reduced, flues positioned beneath said first named heating flues for receiving a cooling medium to cool the reduced ore, and flues positioned above said heating flues for receiving the heated fluid from the cooling flues.

4. Ore reducing apparatus comprising in combination, a plurality of retort passageways for conducting iron ore, heating units positioned between adjacent bodies of ore in said passageways, said heating units being clearly separated from one another by said bodies of ore in said passageways, and means for regulating the heating medium in each of said independent heating units whereby to present and maintain a similar positive reducing zone in each unit.

5. An iron ore reducing apparatus, comprising in combination, spaced means for permitting the continuous passage of adjacent bodies of ore, and heating means including a source of heat for creating heat on both sides of and confined wholly between said adjacent bodies of ore to effect reduction thereof, said means for permitting the passage of the ore being defined by the walls of the heating means to completely separate the ore from the source of heat at all times and to completely separate the adjacent heating means, whereby each heating means will be independent of any adjacent heating means.

6. An ore reducing apparatus for reducing iron ore, comprising in combination, a plurality of spaced retorts, relatively long and narrow in horizontal cross section and arranged in banks to form a furnace unit, the walls of both sides of the retorts also defining independent but completely separate heating chambers confined wholly between the adjacent retorts, means for continuously passing ore to be reduced through the retorts, means for supplying a heating medium to the said independent heating chambers, and means for confining the heating medium within the chambers, whereby the heating medium in each chamber will be confined wholly between adjacent retorts.

7. Ore reducing apparatus for reducing iron ore, comprising a plurality of heating units extending vertically and spaced horizontally in a bank to form a furnace unit, a plurality of retort passageways formed between the walls of said heating units and also arranged in a bank alternately in the bank of heating units, said retort passageways being relatively long and narrow in general cross section with adjacent retort passageways arranged with the heating units wholly confined therebetween, and means for passing ore through the retort passageways whereby said heating units present independent columns of heating medium wholly confined between the spaced retort passageways.

8. Ore reducing apparatus for reducing iron ore, comprising a series of flues positioned one above the other to form a wall relatively long and narrow in cross section, a second series of flues similar to but completely independent of said first series of flues positioned adjacent thereto but spaced therefrom to form between said two series a completely enclosed retort passageway relatively long and narrow in general cross section, a plurality of other series of flues similar to said first series of flues and also spaced to form retort passageways between adjacent series to provide a bank of retorts with the flues confined wholly between adjacent retorts, independent heat creating means in each series of flues whereby to independently confine the heating medium in each series of flues wholly between adjacent retort passageways.

9. Iron ore reducing apparatus, comprising the combination of spaced retorts for confining adjacent bodies of ore and a reducing agent, said retorts being arranged in a row, means for continually feeding the ore and reducing agent to and withdrawing the reduced iron from the retorts, and heating means on both sides of and confined wholly between said retorts to effect reduction of the ore.

10. Iron ore reducing apparatus, comprising the combination of a plurality of retorts relatively long and narrow in horizontal cross section, said retorts being formed in a row with their long sides adjacent to each other, and heating means on both sides of and confined wholly between said retorts, and means for continually feeding ore and reducing agent to and withdrawing the reduced iron from the retorts.

11. Iron ore reducing apparatus, comprising the combination of spaced retorts for permitting continuous passage of adjacent bodies of ore, said retorts being relatively long and narrow in horizontal cross section, means on both sides of and between each of said retorts to provide pre-heating, reducing and cooling zones, heating means to heat each reducing zone, and means to regulate the heating means to maintain any reducing zone at a substantially uniform reducing temperature.

12. Iron ore reducing apparatus, comprising the combination of a plurality of retorts arranged in a row, said retorts being relatively long and narrow in cross section, means between said retorts to provide preheating, cooling and reducing zones, and means for maintaining all of the reducing zones at a substantially uniform reducing temperature.

13. Iron ore reducing apparatus, comprising the combination of a plurality of retorts arranged in a row for confining adjacent bodies of ore, means between said retorts to provide preheating, cooling and reducing zones, means to maintain any reducing zone at a substantially uniform reducing temperature, means for absorbing the heat from the reduced ore in the cooling zone by a cooling medium which thereby becomes heated, and means for utilizing the heated cooling medium to assist in heating the ore.

14. Iron ore reducing apparatus, comprising the combination of a plurality of retorts arranged in a row, said retorts being relatively long and narrow in cross section, means between each of the retorts to provide preheating, reducing and cooling zones, and heating means to heat each reducing zone to a substantially uniform reducing temperature.

In testimony whereof I affix my signature.

WILLIAM H. SMITH.